United States Patent [19]
Yano et al.

[11] Patent Number: 5,412,759
[45] Date of Patent: May 2, 1995

[54] ROBOT CONTROL METHOD AND APPARATUS

[75] Inventors: Tatsuo Yano, Ono; Masayuki Watanabe, Otowa; Kouji Ota, Toyota; Tadayuki Matsumoto, Miyoshi, all of Japan

[73] Assignees: Kawasaki Jukogyo Kabushiki Kaisha, Hyogo; Toyota Jidosha Kabushiki Kaisha, Aichi, both of Japan

[21] Appl. No.: 915,598

[22] Filed: Jul. 21, 1992

[30] Foreign Application Priority Data

Jul. 26, 1991 [JP] Japan .................................. 3-187601

[51] Int. Cl.$^6$ .......................................... G06F 15/46
[52] U.S. Cl. .......................................... 395/83; 395/86
[58] Field of Search ................... 395/82, 83, 84, 90, 395/94, 97, 99, 86, 88, 89; 901/3, 4, 5; 318/568.13

[56] References Cited

U.S. PATENT DOCUMENTS

| | | | |
|---|---|---|---|
| 3,890,552 | 6/1975 | Devol et al. | 395/83 |
| 4,590,578 | 5/1986 | Barto, Jr. et al. | 395/86 |
| 4,613,943 | 9/1986 | Miyake et al. | 395/86 |
| 4,683,544 | 7/1987 | Hariki | 395/86 |
| 4,853,874 | 8/1989 | Iwamoto et al. | 395/83 |
| 4,998,050 | 3/1991 | Nishiyama et al. | 395/83 |
| 5,021,970 | 6/1991 | Mohri et al. | 395/83 |
| 5,041,991 | 8/1991 | Fujiki | 395/83 |
| 5,191,639 | 3/1993 | Hara | 395/97 |

FOREIGN PATENT DOCUMENTS

| | | |
|---|---|---|
| 62-269205 | 11/1987 | Japan . |
| 63-8906 | 1/1988 | Japan . |
| 63-9086 | 1/1988 | Japan . |
| 63-253405 | 10/1988 | Japan . |
| 1-302405 | 12/1989 | Japan . |
| 3-2405 | 1/1991 | Japan . |

*Primary Examiner*—Allen R. MacDonald
*Assistant Examiner*—Stuart B. Shapiro
*Attorney, Agent, or Firm*—Oliff & Berridge

[57] ABSTRACT

Even if a stop position of a supplied workpiece is not accurate, in order which an online robot can accurately perform works such as welding and painting, through the use of an offline robot of the same type as the online robot, detecting three reference positions on a workpiece by a first optical three-dimensional position detection means and teaching can be performed. The first coordinate-transform matrix A1 stores the coordinates of each of the positions for an operation on the workpiece as the taught contents, when it is assumed that the workpiece is at a first reference position. The online robot uses a second coordinate transform matrix A2 to calculate coordinates when it is assumed that the workpiece is at a second reference position of the online robot and stores these in a second memory, and the reference points of the workpiece which is supplied for processing are detected by a second optical three-dimensional position detection means and a third coordinate transform matrix A3 is used to determine each of the positions for operation on the supplied workpiece and the online robot reproduces them and performs the work. Even if the stop position of the supplied workpiece is not accurate, it is possible for operations to be accurately performed on the work.

6 Claims, 5 Drawing Sheets

FIG. 5

ROBOT CONTROL METHOD AND APPARATUS

BACKGROUND OF THE INVENTION

The present invention relates to a robot control method and apparatus.

It is typical in the prior art to use an offline robot, that is, a robot which is at a place different from the place at which actual work is to take place, for the purpose of teaching an online robot. A workpiece is fixed to a fixed position, and a workend of that offline robot is aligned with three or more reference points on the workpiece, and those reference points are stored along with each of a plural number of positions where the work is to be carried out. Work of this type can be painting the bodies of automobiles, for example. Then, an online robot, that is, a robot installed at the position where the actual work is to take place is used for teaching three or more reference points on the workpiece at predetermined stop positions for the performance of the work itself. Then coordinate transform matrices are created for transforming from the offline coordinate position to the online coordinate position, and these coordinate transform matrices are used to transform the teaching data made when offline into teaching data of the online robot.

With this prior art, it is necessary to accurately set the relative positions of the workpiece and each robot both for offline and online measurement, and the teaching involves much trouble if there is a discrepancy in the relative positions of the workpiece and each robot. In addition, when a work is operated upon by a robot, the supplied workpiece must be stopped at a position which is accurate relative to the position of the online robot. If this is not the case, then it will be difficult to perform accurate work.

With other prior art technologies, a matrix PW for the relative positions on the workpiece of the work coordinates is created when teaching of an offline robot is performed and a matrix PR for a position on the robot coordinate system of the workpiece is created in the status where a workpiece is accurately stopped at a predetermined position relative to the position of the offline robot. The matrix PW and the matrix PR are used to calculate the position P on the robot coordinate system of the workend which is to be held by the robot.

However, with such prior art, each of the positions P where the workends of each robot are to operate cannot be actually known unless there is calculation of the product PW·PR. Accordingly, with this prior art, there is the problem that it is not possible to use comparison with the operable range of the robot and to perform teaching while confirming whether the robot is within the operation range, and there is thus the problem that it is not possible to have direct sensory knowledge of the position P of the workend of the robot.

Also, with this prior art, in addition to the matrix PW for the relative position of the workpiece on the work coordinate system, it is also necessary to set data for the shape of the workend of the robot, that is, information for whether the articulated joints of the robot move to the left or right, and for the number of rotations of the articulated joints. Because of this, there is also the problem that the amount of data which has to be stored becomes excessive.

Examples of this prior art are Japanese patent Laid-Open Application No. 269205-1987, No. 8906-1988, No. 253405-1988 and No. 302405-1989.

SUMMARY OF THE INVENTION

An object of the present invention is to provide a robot control method and apparatus which facilitates the teaching operation for a work when processing work such as painting or the like of a workpiece is performed using an online robot.

The present invention is a robot control method and apparatus which sends and receives robot operation data between a first robot and a second robot and performs control of the first and second robots, the robot control system comprising:

a first work detection means which detects a current position of a first workpiece of a first robot, a first transform means which transforms first operation data of a first robot into transformed first operation data when the first workpiece of the first robot is at a first reference position and stores the transformed first operation data in a first memory, a second transform means which transforms the transformed first operation data transformed by the first transform means into second operation data of the robot when the workpiece of the second robot is at a second reference position and stores the second operation data in a second memory, a second work position detection means which detects a current position of the second workpiece of the second robot, and a third transform means which transforms the second operation data transformed by the second transform means into transformed second operation data of the second robot and which is aligned at the current position of the second workpiece of the second robot, and stores the transformed second operation data in a third memory.

According to the present invention, when robot operation data is sent and received between the first robot and the second robot and control is performed, the first work position detection means detects the current position of the first workpiece of the first robot and the first transform means transforms the first operation data of the first robot into transformed first operation data when the first workpiece of the first robot is at the first reference position and stores the transformed first operation data. The second transform means transforms the first transformed operation data into second operation data of the second robot when the second workpiece of the second robot is at the second reference position and stores the second operation data, and the third transform means transforms the second operation data into transformed second operation data of the second robot and which is in alignment with the current position of the second workpiece of the second robot and which is detected by the second work position detection means, and then stores the transformed second operation data.

DETAILED DESCRIPTION OF THE PREFERRED EMBODIMENTS

Figure 1:
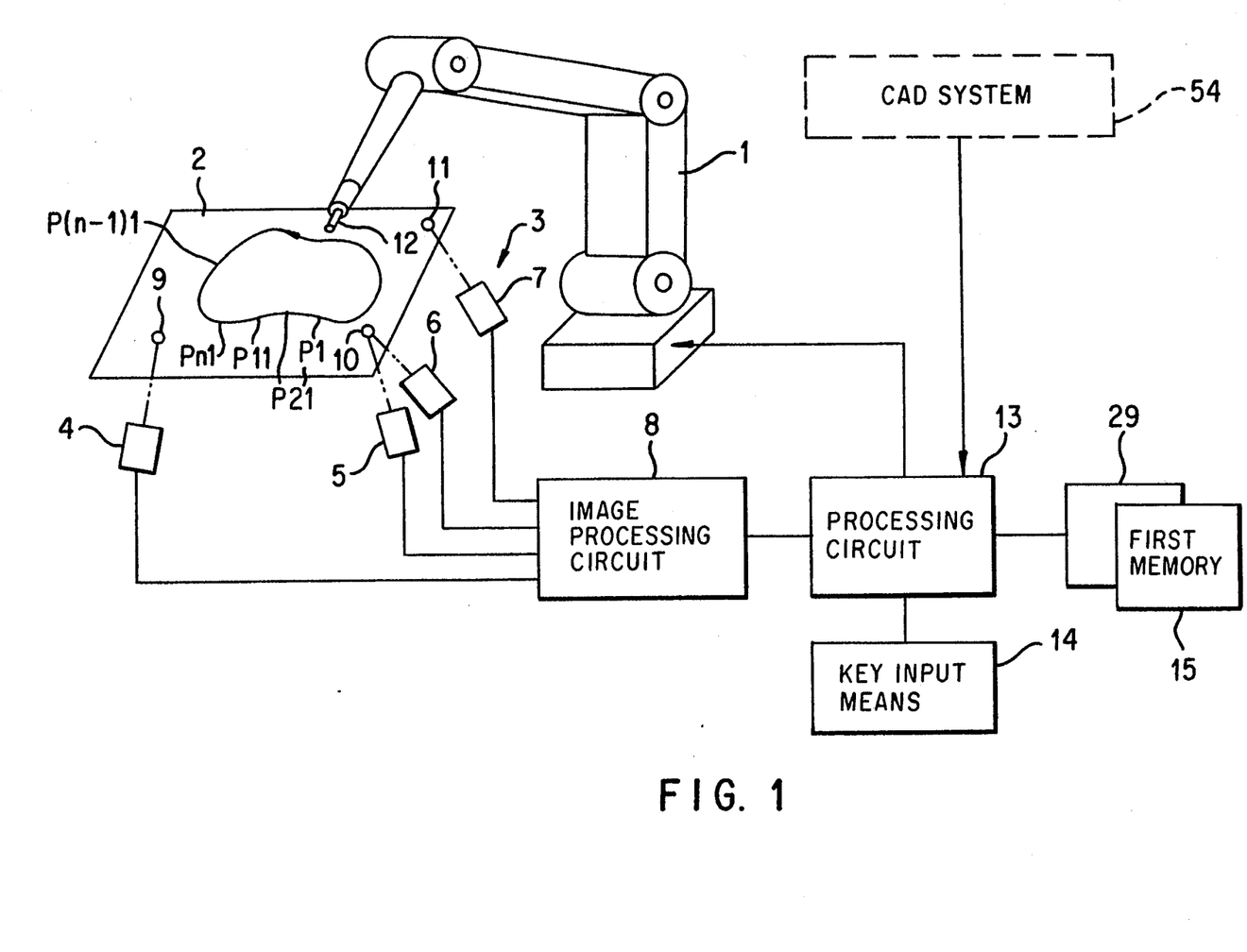
FIG. 1 is a system diagram showing the configuration relating to an offline robot according to a first embodiment of the present invention.

FIG. 1 is a system diagram showing the offline teaching operation relating to a first embodiment of the present invention. In this specification, "offline" refers to the processing operation for operation data performed at an offline work position which differs from the actual work position. The offline robot 1, which performs this offline operation, has a plural number of axes, and for example, is used for painting process work of a workpiece 2 such as an automobile body or the like. In the vicinity of the offline robot 1 is provided an optical three-dimensional position detection means 3, which functions as the first work position detection means for the workpiece 2. The output of the television cameras 4 through 7 is applied to an image processing circuit 8.

The workpiece 2 has at least 3 (3, in the case of the present embodiment) reference points 9 through 11 which are holes. The television cameras 4 through 7 are provided beforehand at predetermined relative positions. The reference point 9 of the workpiece 2 is provided at an arbitrary position in the offline operation range which is an operable range of the offline robot 1, and is detected by the television camera 4. In addition, the reference point 10 is detected by the two television cameras 5, 6 for performing three-dimensional detection, while the reference point 11 is detected by the television camera 7. These television cameras 4 through 7 are used to detect the relative three-dimensional position (discrepancy) between the offline robot 1 and the workpiece 2 through photographing of the reference points 9 through 11 of the workpiece 2 and by subsequent image processing in the image processing circuit 8, and by detection of the status of rotation with respect to the x, y and z axes.

When calibration with the coordinate system of the offline robot 1 and the coordinate system of the cameras 4 through 7 is performed, the reference point which is to be detected, such as for example, a work which has a hole 9, is held in the workend 12 of the robot 1 and the hole 9 which is the reference point in that held work is photographed by the television cameras 4 through 7. Then, the position of the hole 9 on the workpiece 2 obtained by photography by the television cameras 4 through 7 in this manner and the position of the hole 9 in the workpiece 2 held by the workend 12 of the robot 1 are used as the basis for performing calibration between the camera coordinate system and the robot coordinate system.

In this manner, the three-dimensional positions of the workpiece 2 obtained using the television cameras 4 through 7 can be determined through transform to the robot coordinate system of the offline robot 1. Refer to "Richard P. Paul; *Robot Manipulators,* The MIT Press, 1981" for details of this transform method.

Next, the operator operates a key input means 14 which is connected to a processing circuit 13 realized by a microcomputer or the like, and when it is assumed that the workpiece 2 is at a first reference position which has been predetermined for an offline operation location, the three-dimensional positions C10 of the reference points 9 through 11 of the workpiece 2 are input as the coordinate system x, y, z as shown by the List 1 below.

LIST 1

C11 (x11, y11, z11)
C12 (x12, y12, z12)
C13 (x13, y13, z13)

Here, C11 through C13 represents the coordinates of the offline robot coordinate system of each of the reference points 9, 10, 11, and these are generically expressed as C10.

Then, the workpiece 2 is moved to an arbitrary position within the offline operation location and the television cameras 4 through 7 are used to photograph the actual reference points 9 through 11, and to measure and determine the three-dimensional positions C21, C22, C23 of each of the reference points 9 through 11 in the offline robot system, as shown by LIST 2 below.

LIST 2

C21 (x21, y21, z21)
C22 (x22, y22, z22)
C23 (x23, y23, z23)

Next, the first coordinate transform matrix A1 is created beforehand in the processing circuit 13. This first coordinate transform matrix A1 is a coordinate transform matrix used as the first coordinate transform matrix. First transform matrix A1 is used for transformation of the coordinates of the offline robot coordinate system of each of the positions P11, P21, ..., Pn1 (generically expressed by the coordinate P1 in FIG. 3) of the workpiece 2, which are to be operated on, and which are provided at an arbitrary position inside the offline operating location, into each of the positions P12, P22, P32, ..., Pn2 (generically expressed by the coordinate P2 in FIG. 3) on the workpiece 2 when it is assumed that the workpiece 2 is at said predetermined first reference position within the offline operating location. More specifically, this function can be expressed by LIST 3 below.

LIST 3

P2 = A1·P1

Then, the offline robot 1 is used and teaching is performed for each of the positions P12 through Pn2 which are to be operated on for the workpiece 2 provided at an arbitrary position inside the offline work location. The teaching data for each of the taught positions is calculated using the first coordinate transform matrix A1, and the coordinates of each of the positions P12 through Pn2, which are to be operated on for the work placed at a first reference position, are determined. By this process, the discrepancy between the offline robot 1 and the workpiece 2 is calibrated and there is alignment with the reference point. In addition, the memory write means 29 of the offline robot also stores the coordinates of the three reference points 9 through 11 of the workpiece 2 at the first reference position in the first memory 15 beforehand.

Figure 2:
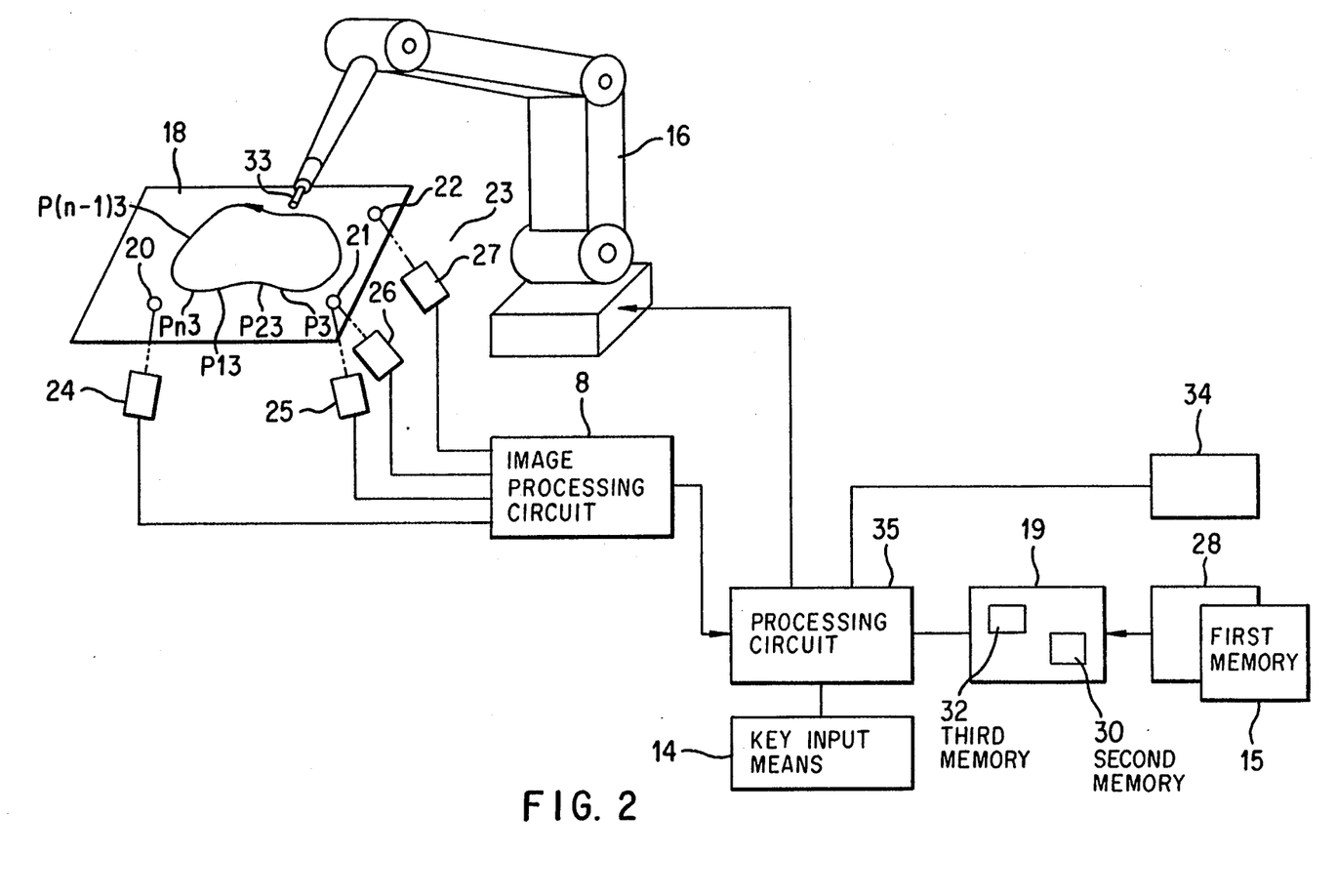
FIG. 2 is a system diagram showing the configuration relating to an online robot according to the first embodiment of the present invention.

FIG. 2 is a system diagram showing the status when the online robot 16 performs a painting operation, which is the work operation that is to be performed at each of the positions P14 through Pn4. The offline robot 1 as shown in FIG. 1 and the online robot 16 as shown in FIG. 2 are of the same type in that they have the same mechanical structure, and also have similar electrical structures. Processing circuit 35 of online robot 16 corresponds to processing circuit 13 of offline robot 1. The second processing means 19 of the online robot 16 is created beforehand and stores the second coordinate transform matrix A2. This second coordinate transform matrix A2 is a coordinate transform matrix for transforming the offline robot system coordinates of the workpiece 2 at a first reference position into the online robot system coordinates C30 for a workpiece 18 at a second reference position determined beforehand for the online operation location of the online robot 16, that is, for inside the range for which the online robot 16 can operate.

The workpiece 18 has a structure the same as that of the workpiece 2 described above, and is provided with reference points 20, 21, 22 corresponding to the reference points 9, 10, 11 on the workpiece 2. In order to detect each of these reference points 20 through 22, there are provided four television cameras 24, 25, 26, 27 comprising a second optical three-dimensional position detection means 23, which functions as the second work position detection means. These television cameras 24, 25, 26, 27 respectively correspond to the television cameras 4 through 7 mentioned beforehand.

The memory read means 28 can read and mount the first memory 15, which stores, the coordinates of the three reference points 9–11 of the first workpiece 2 as written thereto by the memory write means 29 provided with respect to the processing means 13 as shown in FIG. 1. Thus, memory read means 28 reads the contents of the first memory 15 and sends its contents to the processing means 19.

The processing means 19 uses the second coordinate transform matrix A2 to calculate the teaching data from the data stored in the first memory 15, and stores this teaching data beforehand in the second memory 30 of the online robot 16.

In the creation of this second coordinate transform matrix A2 as described above, the position C10 of the reference points 9, 10, 11 set beforehand for the workpiece 2 when the workpiece 2 is placed at a first reference position input by the operator from a key input means 14, is read by the offline robot 1 from the first memory 15 to the online robot 16. In this manner, it is possible to create the second coordinate transform matrix A2 by a comparison between the position C30 of the three reference points 20, 21, 22 of the workpiece 18 at the second reference position of the workpiece 18 when online, and the position C10 of the reference points 9, 10, 11 of the work at the first reference position of the workpiece 2 when offline.

Then, when it is assumed that the workpiece 18 is placed at the second reference position (for which discrepancies have been calibrated), the processing circuit 19 stores beforehand the third transform matrix A3. The third transformation matrix A3 is for transformation of the online robot system coordinates of each of the positions P13 through Pn3 for which there is to be an operation on the workpiece 18, into the online robot system coordinates of each position at which there is to be an operation performed to the workpiece 18 and which are detected by the second optical three-dimensional position detection means 23 provided in the vicinity of the online robot 16.

In this manner, the coordinates C31, C32, C33 of the reference points 20, 21, 22 when the workpiece 18 is at a second reference position and which have been transformed by the second coordinate transform matrix A2 are as shown in LIST 4 below.

LIST 4

C31 (x31, y31, z31)
C32 (x32, y32, z32)
C33 (x33, y33, z33)

These positions C31, C32, C33 are generically expressed by the reference code C30, and when the workpiece 18 is at such a second reference position, the coordinates are expressed as P3 (due to the second transform means) as shown in LIST 5 below.

LIST 5

P3 = A2·P2

The reference points 20, 21, 22 of the workpiece 18 which is stopped after having been conveyed by the supply conveyor means to an arbitrary position within the online operation location of the online robot 16 are detected by the second optical three-dimensional position detection means 23 and each of those coordinates are expressed by the coordinates C41, C42, C43 (generally expressed by C40) of LIST 6 below.

LIST 6

C41 (x41, y41, z41)
C42 (x42, y42, z42)
C44 (x43, y43, z43)

Each of the coordinates C41, C42, C43 of the reference points 20, 21, 22 of the workpiece 18 detected by the second optical three-dimensional position detection means 23 of the online robot 16 are used as the basis for coordinate transform by the third transform matrix A3 of the teaching data stored in the second memory 30. The teaching positions P14 through Pn4 on the workpiece 18, which have been supplied in this manner, are determined as the online robot system coordinates.

When P4 is defined as the online robot system coordinates of the reference points 20, 21, 22 detected by the second optical three-dimensional position detection means 23 on the workpiece 18, LIST 7 below is established as the third transform means.

LIST 7

P4 = A3·P3

The coordinates P4 obtained in this manner are stored in the third memory 32. The online robot 16 takes the workend 33 to the teaching positions P14 through Pn4 on the workpiece 18 as supplied from the third memory 32, and performs a work such as a painting operation.

Figure 3:
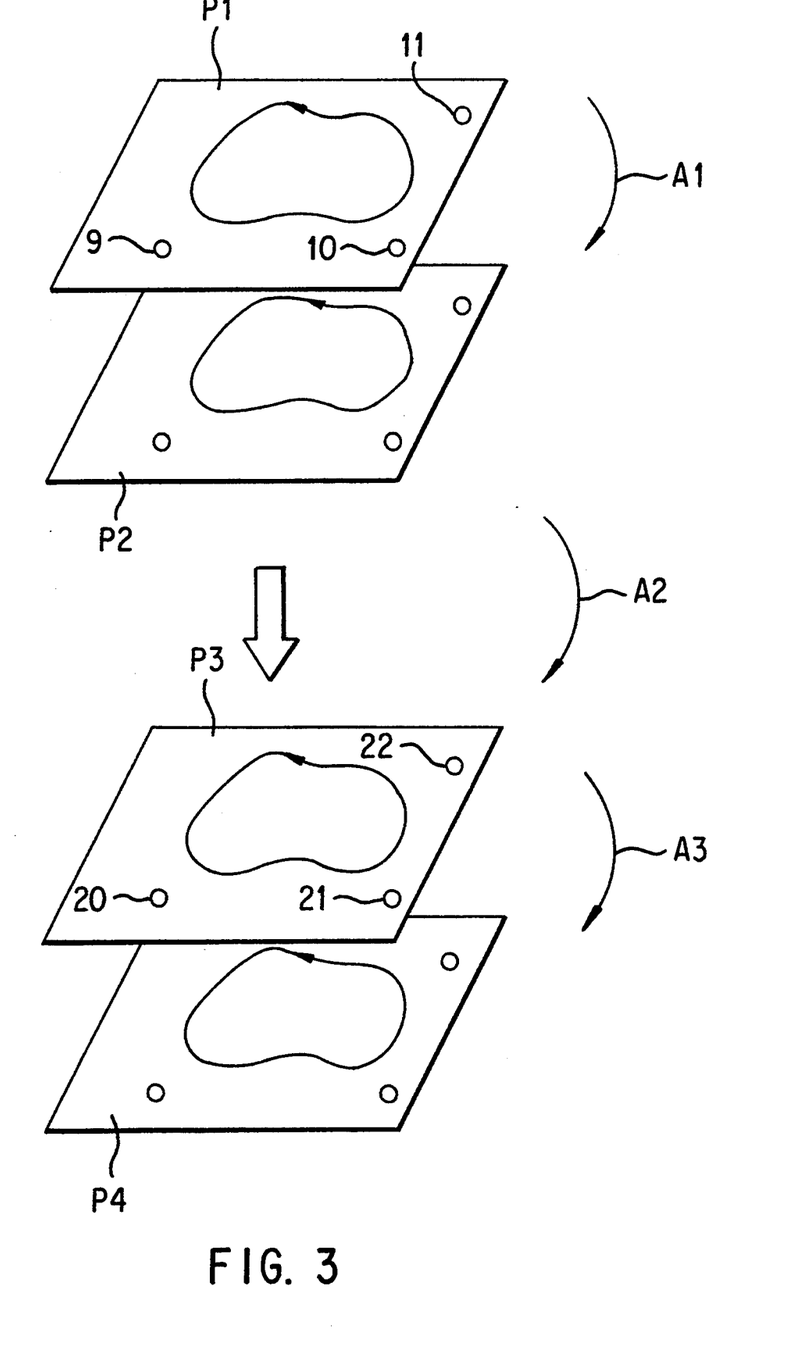
FIG. 3 is a view for describing the coordinate matrices P1 through P4 and the coordinate transform matrices A1 through A3 according to the present invention.
Figure 4:
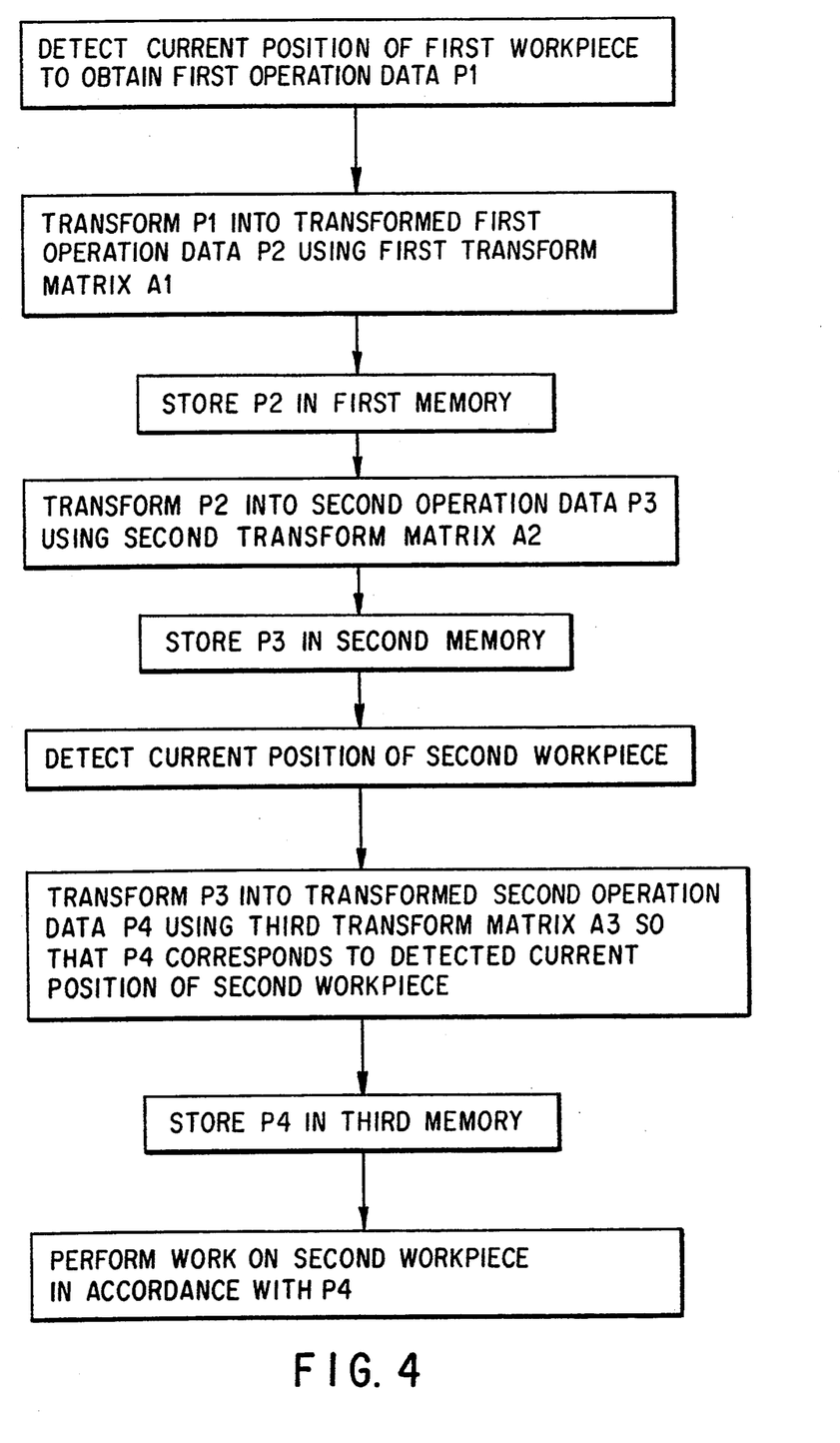
FIG. 4 is a flow diagram showing the steps of an embodiment of the invention.

FIG. 3 is a view showing the status of transform of the coordinate matrix P1 through P4 described above. Each of the coordinate matrices P1 through P4 are transformed as described above, using the first through third coordinate transform matrices A1 through A3. FIG. 4 is a flow diagram showing the steps described above.

As another embodiment of the present invention, instead of determining each of the positions P12 through Pn2 for operation on a workpiece 2 at a first reference position and storing them in the first memory 15 using an offline robot 1, a processing means such as CAD system 54 (shown in broken lines in FIG. 1) or some computer assisted (aided) design means can be used instead of an offline robot as another embodiment of the present invention. In this case, the teaching data which is the online robot system coordinates of each of the positions P14 through Pn4 for operation on the workpiece 18 when it is assumed that the workpiece 18 is placed at a predetermined first reference position within the online operation location of the online robot 16, are created and then stored beforehand in the first memory 15.

The first memory 15 is then mounted to the memory read means 28 and the stored contents are read, and the second coordinate transform matrix A2 transforms the offline robot system coordinates of the workpieces 18 when it is assumed that the workpiece 18 is at the first reference position, into the online robot system coordinates of the workpiece 18 at a predetermined second reference position inside the online operation location of the offline robot 16 and sets them in the processing means 19. In this manner, the teaching data which is stored in the first memory 15 is used by the second coordinate transform matrix A2 to perform calculation, the results of which are stored in the second memory 30 of the online robot 16. Operation after this is the same as for the first embodiment described above.

Instead of the first memory 15 of the embodiment described above being mountable and demountable to and from the memory recording means 29 and the memory read means 28, the data which is to be stored in the first memory 15 can be stored between the processing means 13 and 19. Alternatively, the operator can use a key input means 34 to input the contents to be stored to the first memory 15 to the processing means 19.

In the embodiments described above, the configuration was such that operation data was sent and received by an offline teaching robot. However, an online robot another embodiment of the present invention can be configured so as to perform the receiving of operation data (A2) between an online robot which is the online teaching robot, and an online robot.

Figure 5:
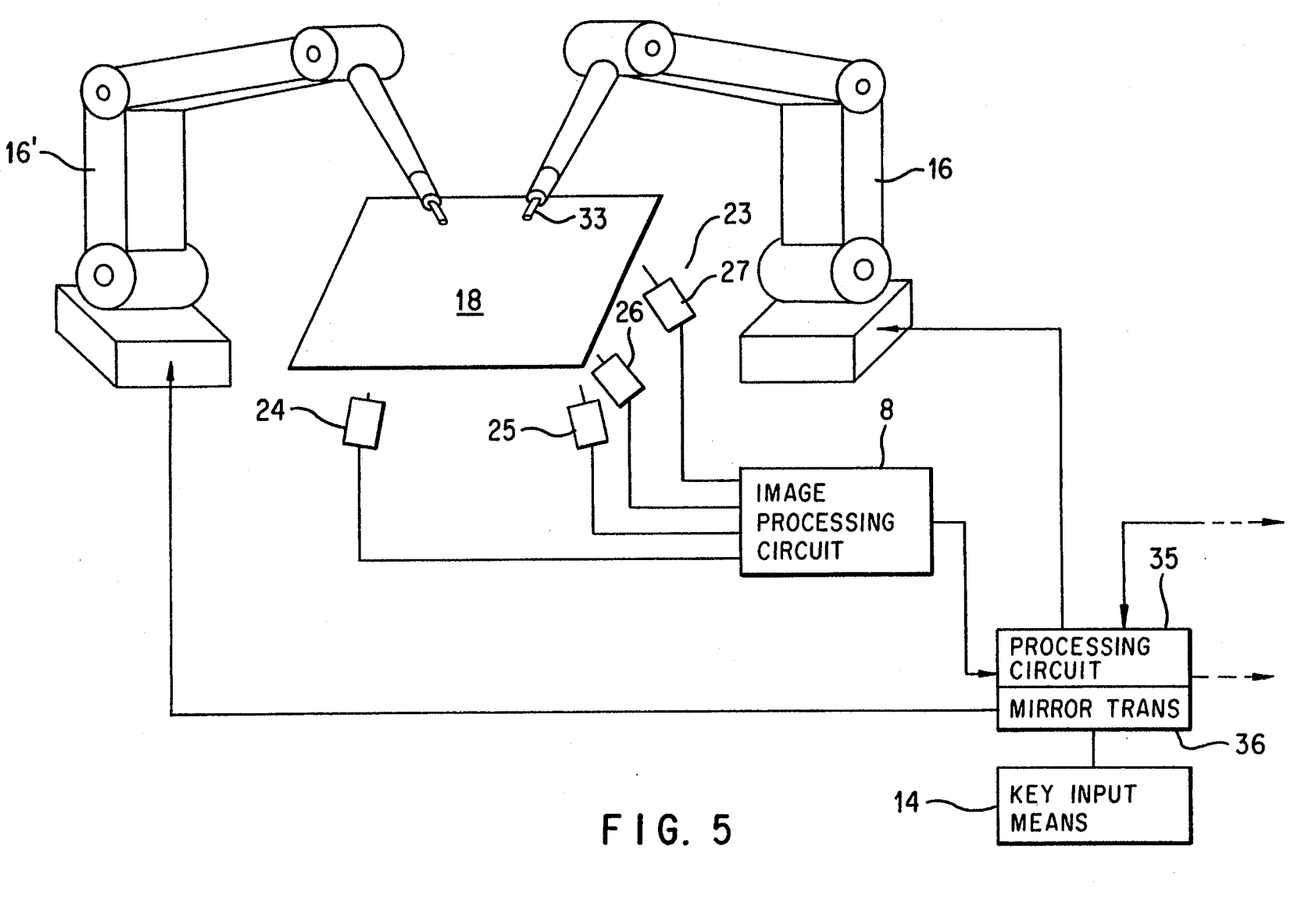
FIG. 5 is a system diagram showing online robots located on the left and right sides of a transfer line.

In addition, still another embodiment could perform the sending and receiving of operation data between an online teaching robot and an online robot, and mirror transformation could be performed by a mirror transform means 36 in processing circuit 35 as shown in FIG. 5 so that that operation data is symmetrical both to the left and to the right of a transfer line when online robots 16 and 16' are provided on the left and right sides of a transfer line, and operation data created for the online robots.

A still further embodiment could perform the sending and receiving of operation data between an online teaching robot and an online robot, and mirror transformation could be performed to create the operation data for the online robot.

According to the present invention as described above, when there is the performance of control for the sending and receiving of operation data of a robot between a first robot and a second robot, the current position of a workpiece of a first robot is detected by a first work position detection means, and the operation data of the first robot is transformed into operation data by a first transformation means when a workpiece of the first robot is at a first reference position, and a second transform means transforms the operation data obtained in that manner into operation data of a second robot when a workpiece of a second robot is at a second reference position, and a third transform means transforms the operation data of a second robot in agreement with a current position of a workpiece of a second robot and so the effect of facilitating teaching operation is produced.

What is claimed is:

1. A robot control method which controls the sending and receiving of operation data between a first robot and a second robot, comprising the steps of:

detecting a current position of a first workpiece of a first robot by a first work position detection means according to first operation data;

transforming said first operation data of said first robot into transformed first operation data using a first transform means, said transformed first operation data corresponding to a position of the first workpiece of said first robot when said first workpiece is located at a first reference position, and storing said transformed first operation data in a first memory;

transforming said transformed first operation data into second operation data using a second transform means, said second operation data corresponding to a position of a second workpiece of a second robot when the second workpiece is located at a second reference position and storing said second operation data in a second memory;

detecting a current position of the second workpiece of said second robot by a second work position detection means;

transforming said second operation data into transformed second operation data using a third transform means so that said transformed second operation data is in agreement with said current position of the second workpiece of said second robot, and storing said transformed second operation data in a third memory and performing a work operation on said second workpiece using said second robot in accordance with said transformed second operation data stored in said third memory.

2. A robot control apparatus which controls the sending and receiving of operation data between a first robot and a second robot, comprising:

a first work position detection means for detecting a current position of a first workpiece of a first robot according to first operation data;

a first transform means for transforming said first operation data of said first robot into transformed first operation data that corresponds to a position of said first workpiece of said first robot when said first workpiece is located at a first reference position, and storing said transformed first operation data in a first memory;

a second transform means for transforming said transformed first operation data into second operation data that corresponds to a position of a second workpiece of a second robot when the second workpiece of said second robot is located at a second reference position, and storing said second operation data in a second memory;

a second work position detection means for detecting a current position of the second workpiece of said second robot;

a third transform means for transforming said second operation data into transformed second operation data so that said transformed second operation data is in agreement with said current position of the second workpiece of said second robot, and storing said transformed second operation data in a third memory; and a controller that controls said second robot to perform a work operation on said second workpiece in accordance with said transformed second operation data stored in said third memory.

3. The robot control apparatus according to claim 2, wherein:
said first robot is an offline robot and said second robot is an online robot.

4. The robot control apparatus according to claim 2, wherein:
said first robot is an online robot, and said second robot is an online robot.

5. The robot control apparatus according to claim 2, wherein:
said first robot is an offline teaching robot, said second robot is an online robot, and said controller includes a mirror transform means which makes operation data sent and received by said online robot symmetrical both to the left and to the right of a transfer line adjacent to said online robot.

6. The robot control apparatus according to claim 2, wherein:
said first robot is an online teaching robot, said second robot is an online robot, and said controller includes a mirror transform means which makes operation data sent and received by said second robot symmetrical to the left and to the right of a transfer line adjacent to said second robot.

* * * * *